US011012360B2

(12) United States Patent
Mehra et al.

(10) Patent No.: US 11,012,360 B2
(45) Date of Patent: May 18, 2021

(54) FLOW CONTROL IN A VIRTUALIZED COMMUNICATION NETWORK

(71) Applicant: TELEFONAKTIEBOLAGET LM ERICSSON (PUBL), Stockholm (SE)

(72) Inventors: Ashwani Kumar Mehra, Bangalore (IN); Brian Alleyne, Los Gatos, CA (US); Chakri Padala, Bangalore (IN); Chandramouli Sargor, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 42 days.

(21) Appl. No.: 16/465,818

(22) PCT Filed: Dec. 15, 2016

(86) PCT No.: PCT/EP2016/081178
§ 371 (c)(1),
(2) Date: May 31, 2019

(87) PCT Pub. No.: WO2018/108278
PCT Pub. Date: Jun. 21, 2018

(65) Prior Publication Data
US 2020/0028787 A1    Jan. 23, 2020

(51) Int. Cl.
*H04L 12/803* (2013.01)
*H04L 12/26* (2006.01)
(Continued)

(52) U.S. Cl.
CPC .......... *H04L 47/125* (2013.01); *H04L 43/16* (2013.01); *H04L 47/25* (2013.01); *H04L 47/30* (2013.01)

(58) Field of Classification Search
CPC ..... H04L 12/803; H04L 12/26; H04L 12/825; H04L 12/835; H04L 47/125; H04L 47/30; H04L 47/25; H04L 43/16
See application file for complete search history.

(56) References Cited

U.S. PATENT DOCUMENTS 8,144,587 B2 * 3/2012 Heinz .................... H04L 47/15
370/235
9,450,881 B2 * 9/2016 Dumitrescu .......... H04L 47/215
(Continued)

FOREIGN PATENT DOCUMENTS

WO    2016128931 A1    8/2016
WO    2016175849 A1    11/2016

OTHER PUBLICATIONS

International Search Report and the Written Opinion of the International Searching Authority, issued in corresponding International Application No. PCT/EP2016/081178, dated Mar. 20, 2017, 14 pages.
(Continued)

*Primary Examiner* — Kyaw Z Soe
(74) *Attorney, Agent, or Firm* — Rothwell, Figg, Ernst & Manbeck, P.C.

(57) ABSTRACT

A device for determining oversubscription of a first virtualized network function (70) in order to enable flow control in the virtualization of at least one node in a communication network comprises a first virtualized network function (70) having packet handling resources comprising at least one queue (108, 112, 114, 120) and being a downstream network function located downstream from at least one second upstream network function in a packet flow between the network functions. The device comprises flow control functionality (79) set to monitor at least one queue (108, 112, 114, 120), determine if the first virtualized network function (70) is oversubscribed based on the monitoring, and generate, in case the first virtualized network function is determined to be oversubscribed, an instruction for at least one upstream network function to change its transmission rate to the first virtualized network function (70) in order to reduce the oversubscription.

17 Claims, 7 Drawing Sheets

(51) Int. Cl.
*H04L 12/825* (2013.01)
*H04L 12/835* (2013.01)

(56) References Cited

U.S. PATENT DOCUMENTS

2015/0280939 A1* 10/2015 Sindhu ............... H04L 12/4641
                                                    370/236
2018/0115501 A1*  4/2018 Reynolds ............ H04L 47/25

OTHER PUBLICATIONS

Bahnasy et al. "Proactive Ethernet Congestion Control Based on Link utilization Estimation," 2016 International Conference on Computing, Networking and Communications (ICNC), Kauai, HI, 2016, 6 pages.

* cited by examiner

FLOW CONTROL IN A VIRTUALIZED COMMUNICATION NETWORK

CROSS REFERENCE TO RELATED APPLICATION(S)

This application is a 35 U.S.C. § 371 National Phase Entry Application from PCT/EP2016/081178, filed Dec. 15, 2016, designating the United States, the disclosure of which is incorporated herein by reference in its entirety.

TECHNICAL FIELD

The invention relates to communication networks using Virtualized Network functions. More particularly, the invention relates to a device method, computer program and computer program product for determining oversubscription of a first virtualized network function for enabling flow control.

BACKGROUND

Communication networks, such as mobile communication networks, have increased in popularity for using a wide variety of services, such as voice and/or video, gaming, chatting and interactions with social media sites etc. These networks are then often operated by an operator and include a number of nodes cooperating for rendering different services to users of the network.

Furthermore, the rendering of such services via a network also often involves computer processing.

Lately, due to a variety of reasons, it has become attractive to move a Network Function from a Physical form, for instance deployed on a physical multi-service edge router platform, to a deployment on a Cloud where the Network function may run on Commercial off-the-shelf (COTS) Hardware. The function may run on bare-metal servers, or in a virtualized form as a virtual machine (VM) or container along with other services co-hosted on a single COTS server.

The way that some of this is done has been standardized, for instance by the European Telecommunications Standards Institute (ETSI) as a concept called network functions virtualization (NFV) in which virtual network functions (VNFs) are realized.

Figure 1:
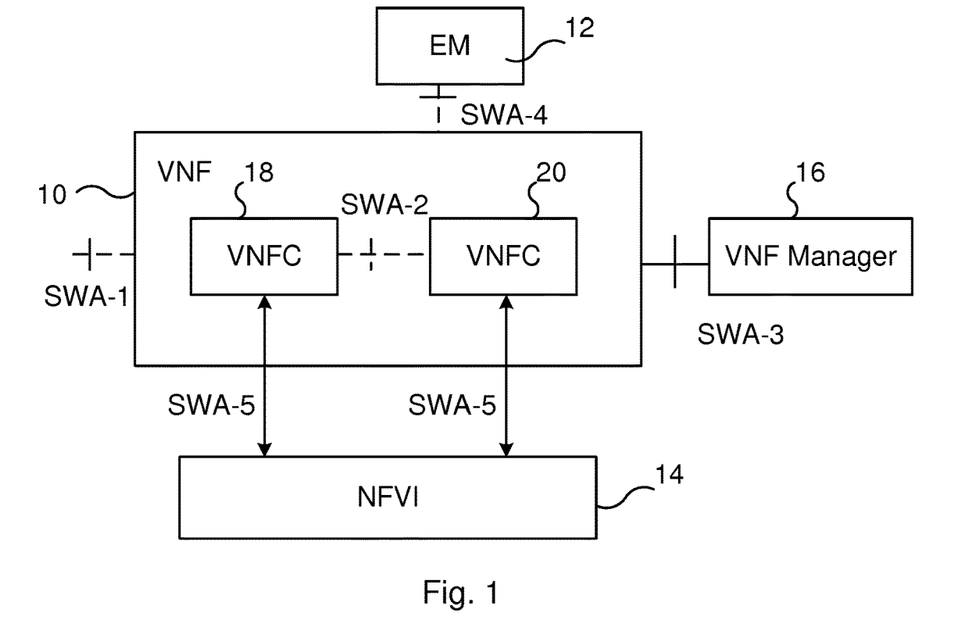
FIG. 1 schematically shows a standardised virtual network function (VNF)

Network Functions Virtualization includes virtualization of Packet Processing and Service Functions, which as stated above typically run on COTS platforms. FIG. 1 shows a diagram of a VNF architecture from ETSI in the specification ETSI GS NFV-SWA 001 V1.1.1.

A VNF 10 comprises one or more Virtual Network Function Components (VNFCs), where a first and a second VNFC 18 and 20 are shown in the figure. Moreover, the VNF 10 comprises a first Software Application Interface SWA-1, a second Software Application Interface SWA-2, a third Software Application Interface SWA-3, a fourth Software Application Interface SWA-4 and a fifth Software Application Interface SWA-5.

Here SWA-1 is provided as an interface enabling communication with another VNF, the interface SWA-2 enables communication between the VNFCs 18 and 20 of the VNF 10, SWA-4 enables communication between the VNF 10 and element management EM 12, the interface SWA-3 enables communication between the VNF 10 and a VNF manager 16 and the interfaces SWA-4 and SWA-5 enable communication between the VNFCs 18 and 20 and a Network Function Virtualization Infrastructure (NFVI) 14.

Depending on the VNF, more than one VNFC may handle traffic or service flows in the communication network based on cloud hosted virtual network functions. In other cases, there may be multiple VNFCs handling traffic or service flow processing, while additional VNFCs may be performing other functions like handling control plane aspects.

Figure 2:
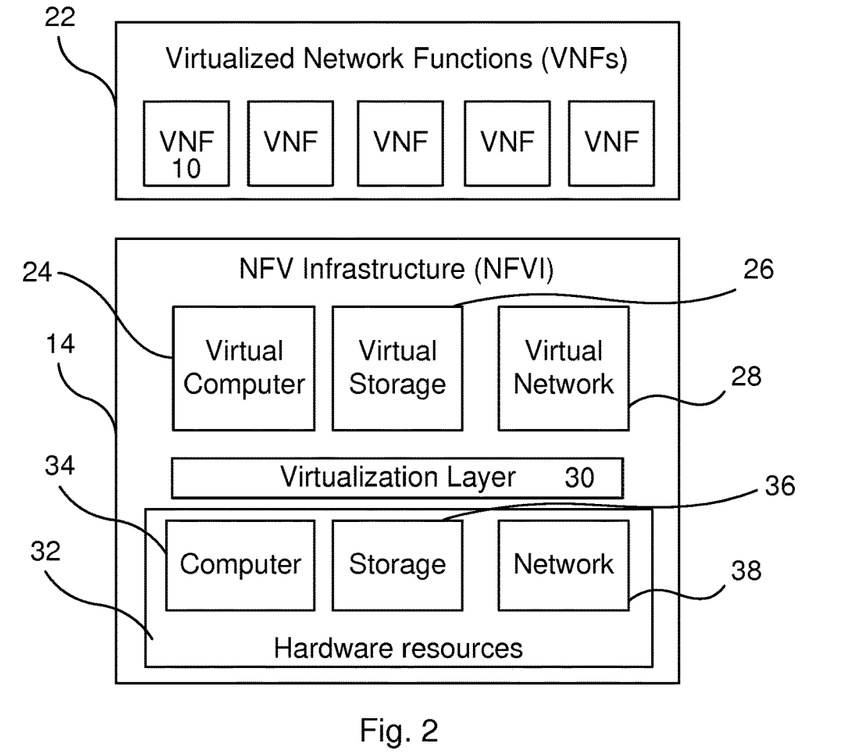
FIG. 2 schematically shows a standardized network functions virtualization (NFV) architecture.

FIG. 2 shows a high level NFV framework of the implementation of VNFs as software entities that are run over an NFVI 14. There are a number of VNFs, where a first 10 is identical to the one shown in FIG. 1. The VNFs are software implementations of network functions capable of running over the NFVI 14. The NFVI 14 in turn comprises a virtual computer 24, a virtual storage 26 and a virtual network 28 mapped via a virtualization layer 30 onto actual hardware resources 32, such as a computer 34, a storage 36 and a network 38.

Figure 3:
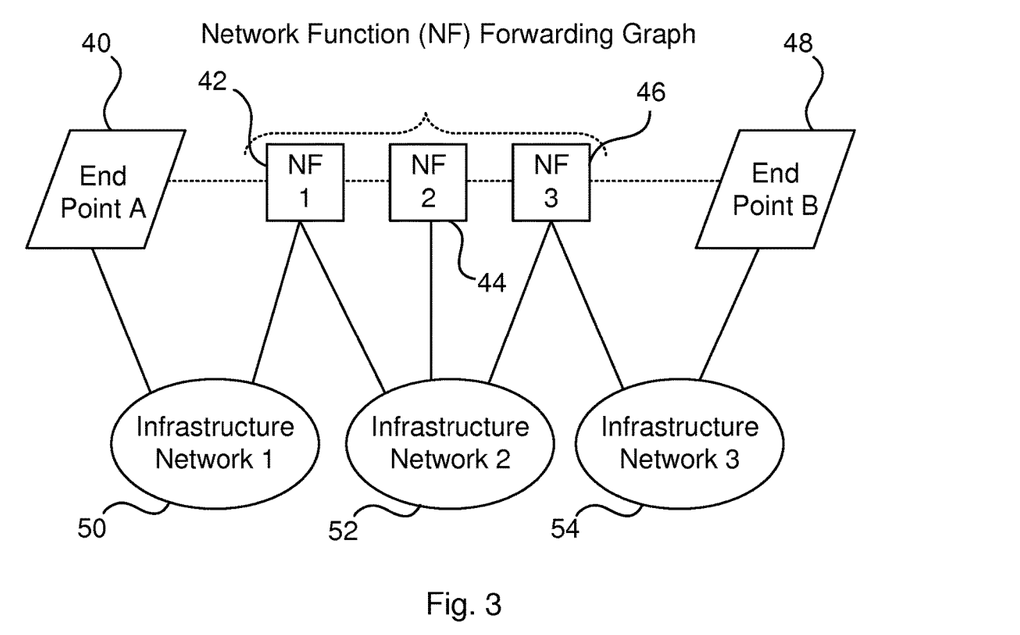
FIG. 3 shows a standardised network forwarding graph, FIG. 4 schematically shows an example of communication network as well as various nodes in the communication network.

Another ETSI defined scenario is a Network Function (NF) Forwarding Graph, as shown in the FIG. 3, where network connectivity between NFs is depicted.

A NF Forwarding Graph provides and end-to-end Network service, via sequential processing across a series of NFs. This scenario is to an extent analogous to the Composite VNF of FIG. 1, in the sense that a set of VNFs interact over a connection between any type of VNFs providing a Network Service.

As can be seen in FIG. 3 a first and second end point 40 and 48 thus communicate via a number of network functions NF1 42, NF2 44 and NF3 46 under the control of a first infrastructure network 50, a second infrastructure network 52 and a third infrastructure network 54, where logical links interconnect the infrastructure network elements 50, 52 and 54 with the end points 40 and 48 and the network functions 42, 44 and 46.

FIGS. 2 and 3 can be found in ETSI GS NFV 002.

As can be seen, it is possible to virtualize the network functions performed by a node and the node functionality may get hosted in the "cloud". It can also be seen in FIG. 3 that processing made by the network functions can be made along a process flow, where an upstream network function, such as the first network function NF1 42, delivers data packets on which a downstream network function, such as the second network function NF2 44, is to operate.

The cloud environment on which VNFs are deployed can vary in different aspects. COTs hardware may for instance be different with different performance specifications and the VNFs may be sharing the physical host resources (Central Processing Unit (CPU)/cache/memory etc.) with other virtual loads with different characteristics.

A traffic flow may be received by a VNF from other upstream network functions deployed as physical network functions (PNFs) or again in virtualized form (VNF) on a cloud. Packet processing can also vary over time because of an increase in number of a certain type of packets that require extensive processing.

Now the communication flow processing capability of a VNF is majorly determined by aspects like the amount of computer resources the VNF is assigned, the CPU clock rate, CPU cache usage pattern for the network function, amount of memory usage and access pattern, etc. At least some of these characteristics may vary across different COTS hardware and when other VNFs share the same host. Thus, VNF performance level to an extent becomes non-deterministic across different instances of the same VNF.

Given the non-deterministic environment, it may be difficult to qualify the exact performance characteristics of VNF instances even for a single VNF type.

As such, it is quite likely that the VNF instances may show variance in terms of their packet processing/service application performance. This can eventually manifest in terms of a VNF instance in a VNF graph/composite VNF getting oversubscribed in terms of not being able to process incoming traffic flows, and consequently leading to traffic drops inside the specific VNF. An oversubscription therefore has as a consequence inability to timely process packets in a virtual network function.

There is therefore a need for improvement in this respect.

SUMMARY

One object of the invention is to improve flow control in a communication network that uses cloud computing by hosting network functions on cloud computers.

This object is according to a first aspect achieved by a device for determining oversubscription of a first virtualized network function in order to enable flow control in the virtualization of at least one node in a communication network. The device comprises a first virtualized network function having packet handling resources comprising at least one queue and being a downstream network function located downstream from at least one second upstream network function in a packet flow between the network functions. The device comprises a processor acting on computer instructions whereby the device is operative to implement flow control functionality set to:

monitor the at least one queue, determine if the first virtualized network function is oversubscribed based the said monitoring, and generate, in case the first virtualized network function is determined to be oversubscribed, an instruction for at least one upstream network function to change its transmission rate to the first virtualized network function in order to reduce the oversubscription.

The object is according to a second aspect achieved through a method of determining oversubscription of a first virtualized network function for enabling flow control in the virtualization of at least one node in a communication network. The first virtualized network function has packet handling resources comprising at least one queue and is a downstream network function located downstream from at least one second upstream network function in a packet flow between the network functions. The method is performed by flow control functionality in a device for determining oversubscription and comprises:

monitoring the at least one queue, determining if the first virtualized network function is oversubscribed based on the monitoring, and generating, in case the first virtualized network function is determined to be oversubscribed, an instruction for at least one upstream network function to change its transmission rate to the first virtualized network function in order to reduce the oversubscription.

The object is according to a third aspect achieved through a computer program for determining oversubscription of a first virtualized network function in order to enable flow control in the virtualizing of at least one node in a communication network. The first virtualized network function has packet handling resources comprising at least one queue and is a downstream network function located downstream from at least one second upstream network function in a packet flow between the network functions. The computer program comprises computer program code which when run by a processor forms the flow control functionality of a device for determining oversubscription and is operative to:

monitor the at least one queue, determine if the first virtualized network function is oversubscribed based on the monitoring, and instruct, in case oversubscription is being determined, at least one virtualized upstream network function to change its transmission rate to the first virtualized network function in order to reduce the oversubscription.

The object is according to a first aspect achieved through a computer program product for determining oversubscription of a first virtualized network function in order to enable flow control, the computer program product comprises a data carrier with computer program code according to the third aspect.

An oversubscribed virtual network function may be a virtual network function that has been assigned more packets from other upstream network functions than it can handle. Oversubscription may therefore also be the inability of a virtual network function to timely process the packets it receives.

In a first variation of the first aspect, the flow control functionality is further set to track a queue occupancy measure of the queue and when determining if the first virtualized network function is oversubscribed is set to compare the queue occupancy measure with a first threshold and determine that the first virtualized network function is oversubscribed in case the first threshold is crossed.

In a corresponding variation of the second aspect, the method further comprises tracking a queue occupancy measure of the queue and the determining of if the first virtualized network function is oversubscribed comprises comparing the queue occupancy measure with a first threshold and determining that the first virtualized network function is oversubscribed in case the first threshold is crossed.

A queue occupancy measure may for instance the number of packets in a queue or the rate with which the queue is filled, for instance expressed as the rate with which the queue length is changed.

There may also exist a set of further thresholds and at least one of the thresholds may be tunable.

In a second variation of the first aspect, the flow control functionality, when being set to determine if the first virtualized network function is oversubscribed, is set to compare the queue occupancy measure with a further threshold and determine a degree of oversubscription based on which threshold is being crossed. The crossing of a threshold also triggers the generation of a corresponding instruction to the at least one upstream network function to change its transmission rate to the first virtualized network function.

In a corresponding variation of the second aspect, the determining if the first virtualized network function is oversubscribed comprises comparing the queue occupancy measure with a further threshold and determining a degree of oversubscription based on which threshold is being crossed. Here, the crossing of a threshold also triggers the generation of a corresponding instruction to the at least one virtualized upstream network function to change its transmission rate to the first virtualized network function.

In a third variation of the first aspect, the flow control functionality is further set to determine a second upstream network function at least partly responsible for the oversubscription, to determine the transmission rate of the second upstream network function and when generating an instruction for at least one upstream network function to change its transmission rate to the first virtualized network function is set to generate an instruction for the determined upstream network function to reduce its transmission rate.

In a corresponding variation of the second aspect the method comprises determining a second upstream network function at least partly responsible for the oversubscription as well as the transmission rate of this function, where the generating of an instruction for at least one upstream network function to change its transmission rate to the first virtualized network function comprises generating an instruction for the determined upstream network function to reduce its transmission rate.

In a fourth variation of the first aspect, the flow control functionality is further set to keep, for every upstream network function, a number of related queue attributes associated with the at least one queue and the queue occupancy measure, investigate the queue attributes of queues on the downstream virtual network function corresponding to the different upstream network functions and determine an upstream network function to be instructed based on the attribute investigation.

In a corresponding variation of the second aspect, the method further comprises keeping, for every upstream network function, a number of related queue attributes associated with the at least one queue and the queue occupancy measure, investigating the queue attributes of queues on the downstream virtual network function corresponding to the different upstream network functions and determine an upstream network function to be instructed based on the attribute investigation.

A queue attribute may in this case be a measure of the number of packets from a source in the queue and/or the rate with which packets from the source in the queue changes, for instance in relation to corresponding queue occupancy measures or corresponding queue attributes of other sources. A queue packet attribute that may be used may be a source media access control (MAC) address to identify an upstream source.

According to a fifth variation an instruction may comprise a value identifying an amount of transmission rate change that is based on at least one attribute.

According to a sixth variation of the first aspect, the flow control functionality is further set to update the attributes as content of the queues is changed.

According to a corresponding variation of the second aspect, the method comprises updating the attributes as the content of the queues is changed.

The instruction for a determined upstream network function may comprise an indication of a quality of service for which the rate of change is applicable.

The device may furthermore comprise the second network function as a virtualized network function having an output queue dedicated to the first network function, According to a further variation of the first aspect, the flow control functionality is then further set to control the transmission rate of the transmissions from the output queue according to the instruction.

According to a corresponding variation of the second aspect, the method then further comprises controlling the transmission rate of the transmissions from the output queue according to the instruction.

The second virtualized network function may also comprise an output queue dedicated to another downstream function than the first virtualized downstream function.

According to yet another variation of the first aspect, the flow control functionality is then further set to independently control the transmission rates of each output queue may based on different indications of transmission rate reductions from the different downstream functions.

The invention according to the above-mentioned aspects has a number of advantages. It enables a flow control that avoids oversubscription of a virtualized network function and thereby loss of packets may be avoided. The oversubscription determination is internal to the composite VNF with no dependency on the cloud infrastructure. Thereby adaptive control of service flows through a virtual network function is allowed and thereby it is possible to correctly handle bursts in service flows, and avoid undesirable head-of line (HOL) blocking scenarios.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Figure 4:
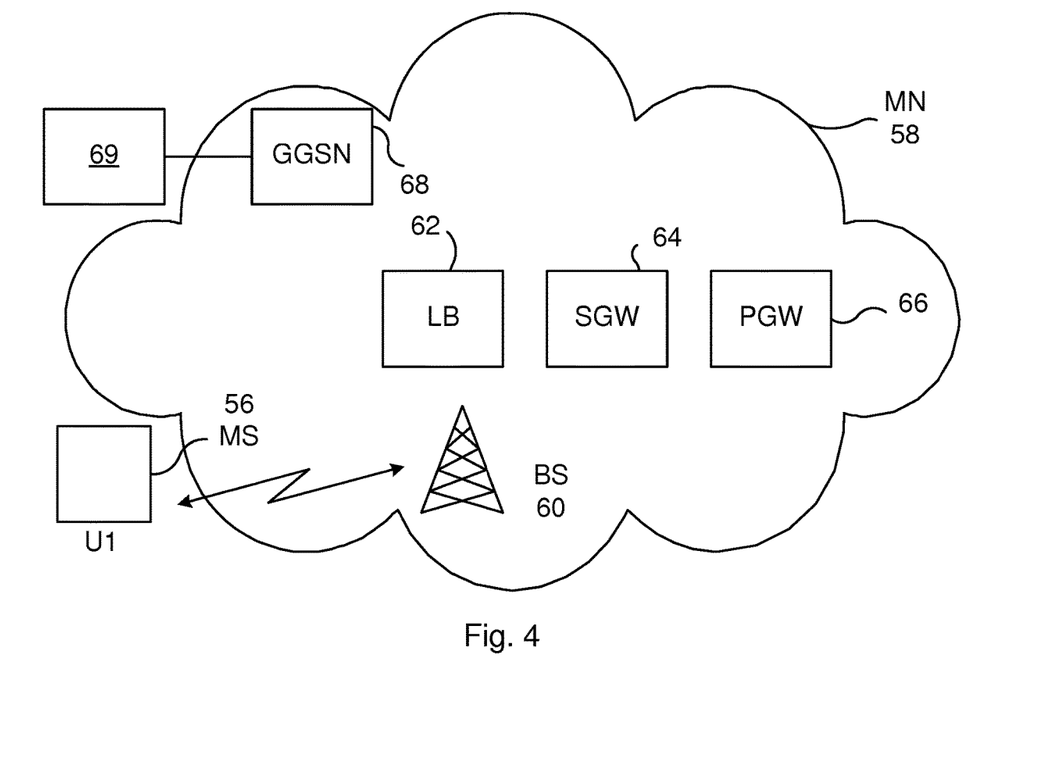

FIG. 4 schematically shows a communication network, which in the present example is a telecommunication network. Furthermore, the communication network is in this case a mobile communication network MN 58 comprising a base station BS 60, a load balancer LB 62, a serving gateway SGW 64, a PDN gateway PGW 66, where PDN is an acronym for Packet Data Network, and a gateway GPRS support node (GGSN) 68, where GPRS is an acronym for General Packet Radio Service. GGSN 68 is provided in order to allow communication with entities outside of the network 58. The GGSN 68 is shown as being connected to one such external entity 69. There is furthermore a mobile station MS 56 wirelessly communicating with the base station 60. The mobile communication network 58 may furthermore be a network allowing Internet connectivity such as Long Term Evolution (LTE) or Wideband Code Multiple Access (WCDMA).

Aspects of the invention will in the following be described in relation to functionality of the mobile communication network 58 having been moved to the cloud. However, the invention is not limited to being applied for a mobile communication network, but may for instance be applied for any type of communication network such as a computer communication network. The mobile communication network is thus merely an example of a communication network for which aspects of the invention may be used.

The base station 60, which is often termed eNodeB or just NodeB, is furthermore provided in a part of the mobile communication network 58 termed access network or radio access network, while the other devices are provided in a part of the mobile communication network 58 termed a core network, which in this example is a so-called Evolved Packet Core (EPC) Network.

A user U1 of the mobile communication network 58 is furthermore equipped with a terminal 56, often termed a mobile station MS, via which he or she may communicate with other users and entities via the mobile communication network 58. The user U1 may for instance want to communicate with the external entity 69, for which a communication session may be set up via the base station 60 and core network nodes. A session may here be any type of communication such as a session involving a web browser used to visit a social media site or a voice session.

Figure 5:
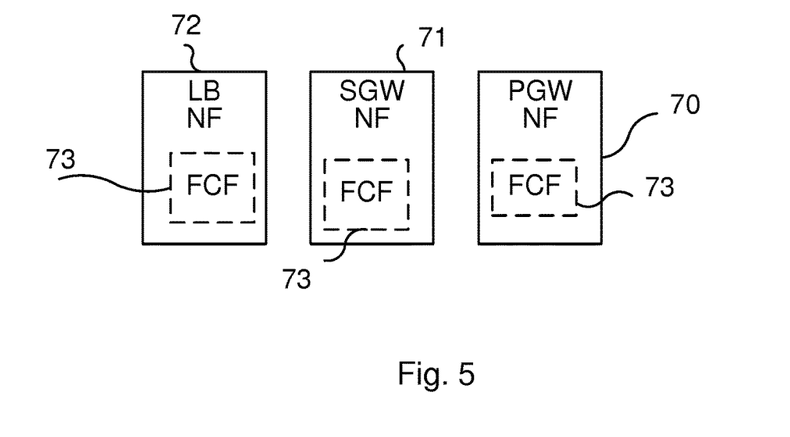
FIG. 5 shows the virtualization of the functions of some of the nodes together with flow control functionality.

The functionality of two or more of the nodes in the network in FIG. 4, and in this example the functionality of the load balancer 62, SGW 64 and PGW 66, have thus been moved to the cloud. The network functions performed by these nodes have thus been moved to one or more computers in a data centre. As is shown in FIG. 5, the functionality of the PDN gateway PGW 66 is more particularly provided in a first virtualization block 70, the network function of the serving gateway SGW 64 is provided in a second virtualization block 71 and the network function of the load balancer LB 62 is provided in a third virtualization block 72. Thereby block 70 is also considered to be a first virtualized network function, block 71 a second virtualized network function and block 72 a third virtualized network function. Each of these virtualized network functions moreover comprise flow control functionality FCF 73, which flow control functionality 73 controls the data packet flow between at least two of the virtualized network functions. Moreover, the flow control functionality 73 may be provided in the form of an Infra layer within a VNFC (in a composite VNF) or in a VNF (in case of a forwarding graph).

The functionality may thus be implemented in one or more Virtual Network Functions (VNFs) or in a group of VNFs forming a composite VNF and end-end flow control management function.

Figure 6:
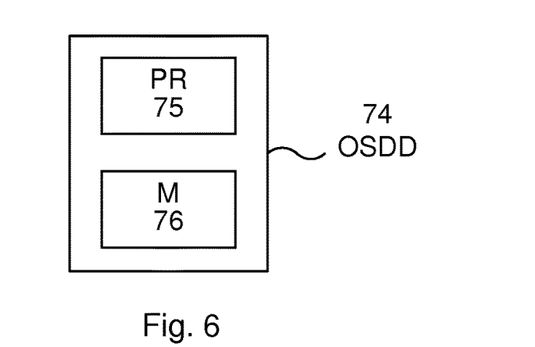
FIG. 6 shows a block schematic of one way of realizing a device for determining oversubscription comprising such flow control functionality.

FIG. 6 shows a block schematic of one way of realizing an oversubscription determining device OSDD 74. It may be provided in the form of a processor PR 75 connected to a program memory M 76. The program memory 76 may comprise a number of computer instructions implementing one or more corresponding virtualized functions and flow control functionality 73 for one or more of the virtualized functions. The processor 75 in turn implements this functionality when acting on these instructions. It can thus be seen that the combination of processor 75 and memory 76 provides the oversubscription determining device 74.

Figure 7:
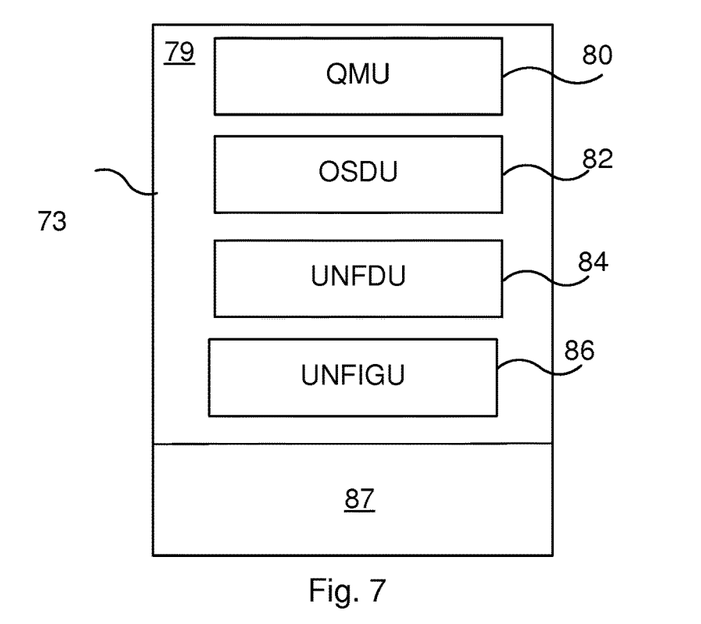
FIG. 7 shows a block schematic of one way of realizing the flow control functionality.

FIG. 7 shows a block schematic of one way of realizing the flow control functionality 73. The functionality 73 may comprise a first part 79 and a second part 87, where the first part 79 may comprise a queue monitoring unit QMU 80, an oversubscription determining unit OSDU 82, an upstream network function determining unit UNFDU 84 and an upstream network function instruction generating unit UNFIGU 86. Details of the second part will be given later.

Figure 8:
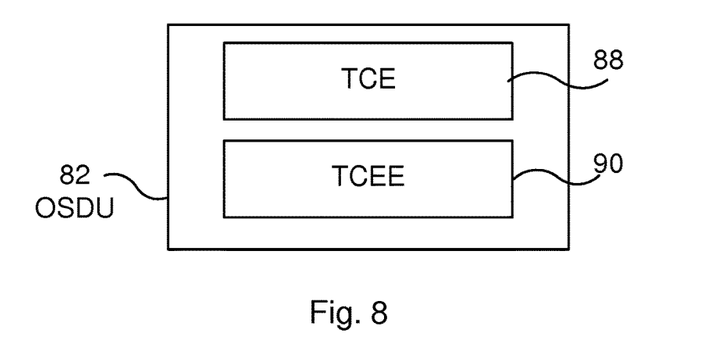
FIG. 8 shows a block schematic of the elements of an oversubscription determining unit of the flow control functionality.

FIG. 8 shows a block schematic of some elements of the oversubscription Determining Unit OSDU 82. It comprises a threshold comparing element TCE 92 and a threshold crossing evaluating element TCEE 90.

Figure 9:
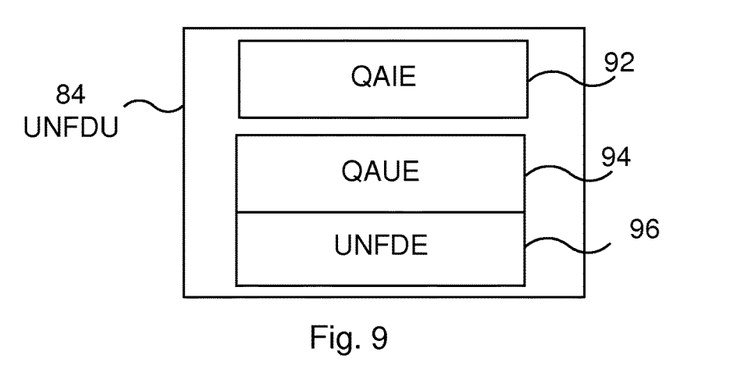
FIG. 9 shows a block schematic of the elements of an upstream network function determining unit of the flow control functionality, FIG. 10 schematically shows one way in which communication may take place in a composite virtual network function, FIG. 11 schematically shows another way in which communication may take place in a composite virtual network function, FIG. 12 schematically shows a further way in which communication may take place in a composite virtual network function, FIG. 13 schematically shows the implementation of a first virtualized network function as a generic forwarding model of a forwarding/service VNFC.

FIG. 9 shows a block schematic of some elements of the upstream network function determining unit UNFDU 84. It may comprise a queue attribute investigating element QAIE 92, a queue attribute updating element QAUE 94 and an upstream network function determining element UNFDE 96.

The units and elements in FIGS. 7, 8 and 9 may be provided as software blocks for instance as software blocks in a program memory.

As mentioned earlier various types of processing is performed for a session, such as a communication and/or service session involving the mobile station 56 and the external entity 69, as well as for other types of activities in the communication network 58. Such processing may be allocated to the cloud such as to the virtual network functions 70, 71 and 72 in FIG. 5.

There is a problem with this type of operation and that is that the capabilities of the cloud computers to handle tasks, like computations, may vary considerably. One cloud computer may for instance be new and fast and another old and slow. Moreover, "cloud computers" (or COTs hosts) will typically be shared by multiple "VNFs". This may lead to subtle performance related impacts on all VNFs sharing that particular "cloud computer. Furthermore, as is shown in FIG. 3, the processing may be flow based, in that one processing task being performed downstream may be depending on upstream processing.

This may lead to some virtual network functions being overloaded or oversubscribed with regard to some part of their Input/Output (I/O) or service processing capability, which may lead to traffic drop on these virtual network functions, where a traffic drop may be the dropping of packets.

An oversubscribed virtual network function is a downstream virtual network function that has been assigned more packets than it can handle by upstream network functions. Oversubscription may therefore be the inability of a virtual network function to timely process the packets it receives, which may lead to the dropping of packets.

Aspects of the invention are concerned with determining oversubscription of a virtual network function situated downstream of another physical or virtual network function and the adjusting of the rate of flow of traffic such as data packets from upstream network functions (physical or virtual) to the downstream virtual network function in order to enable flow control and reduce such oversubscription, where the oversubscription may be due to the "variable and non-deterministic" performance related characteristics of allocated cloud based COTS hosts for the specific VNFs computers.

The first virtual network function may have packet handling resources comprising at least one queue and may thus be a downstream network function located downstream from one or more second upstream network functions in a packet flow between the network functions.

Moreover, the network functions for which the flow control is performed are network functions used in the virtualization of at least one node in a communication network, such as the previously mentioned communication network.

This determining of oversubscription and flow control may be handled through monitoring at least one queue, such as a packet queue, in the downstream virtual network function for a thread or process and to determine, based on the monitoring, if the virtual network function is oversubscribed. The monitoring may involve monitoring ore or more queues and seeing that the one or more queues are getting persistently backlogged over a period of time. The backlogging of one or more queues indicates that the VNF threads servicing the specific queues may not be able to keep up with the incoming rate of traffic flows to these queues. In case the virtual network function is determined to be oversubscribed then an instruction for one or more physical or virtual upstream network functions is generated for changing their transmission rates to the given downstream virtual network function in order to reduce the oversubscription.

An oversubscription may in this case be an indication about the fact that the processing of a cloud computer made for the first virtual network function is not being up to par and this can be handled through instructing the upstream virtual network function responsible for sending data that is processed having its transmission rate reduced in order to handle the situation, where the transmission rate may be a packet transmission rate.

How this may be carried out will now be described in some more detail with reference again being made to FIG. 1.

As was mentioned initially, depending on the Virtual Network Function (VNF), more than one Virtual Network Function Component (VNFC) may handle traffic or service flows. In other cases, there may be multiple VNFCs handling traffic or service flows processing, while additional VNFCs may be performing other functions like handling control plane aspects. VNFCs may be combined in a VNF in a number of different ways, in which some are mentioned below.

One way is to implement the VNF as a Scale-out Virtual Router.

A typical Virtual Router architecture may comprise a single Virtual Machine (VM) providing both control plane and forwarding plane functionality, where a virtual machine may be realized as a combination of a virtual computer and a virtual storage. A Scaled-Out Virtual Router architecture on the other hand, for instance the Ericsson Virtual Router (EVR), will typically comprise separate Control Plane and multiple Forwarding (and Service) VMs (or potentially Containers). This model is similar to the composite VNF model briefly described above.

Each of the VMs in the scaled-out virtual router will be recognized as a separate logical "card" instance by a Virtual Router Control and Management plane. The Control plane supports applying forwarding related configuration on "ports" belonging to the virtual "Forwarding Line Cards".

Figure 10:
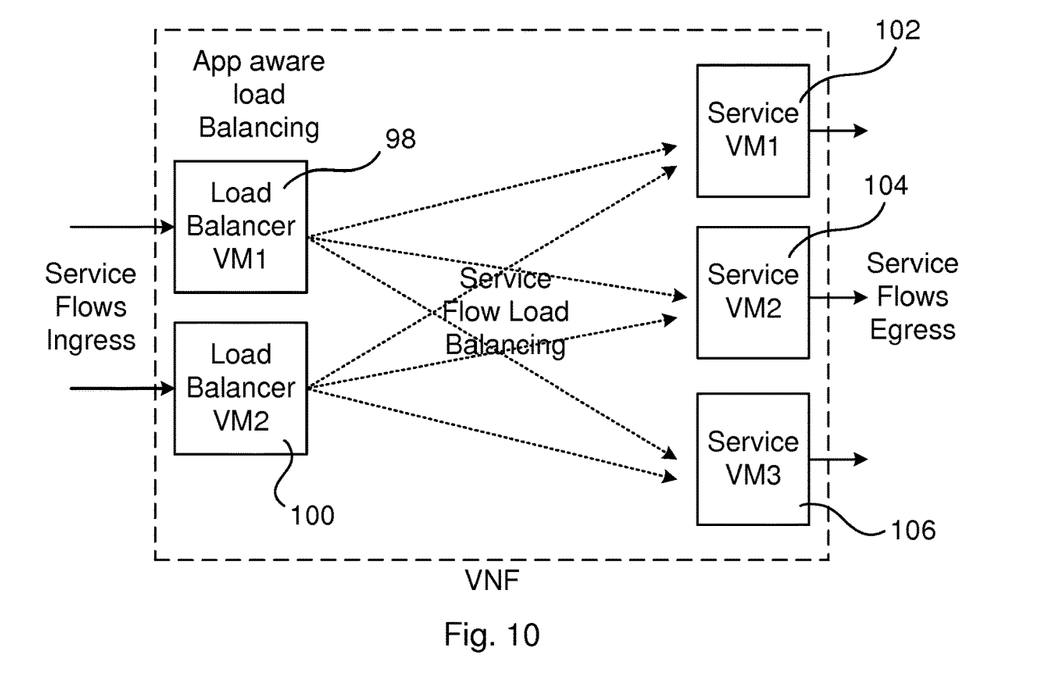

Another way of implementing a Composite VNF is through implementing it through separate Load Balancer and Service VNFCs. A Service VNF implementation internally may comprise one or more Application aware Load Balancer VNFCs and separate Service VNFCs. Service flows ingress on the Load Balancer VMs, which are then distributed/load balanced to Service VMs. The service VMs apply appropriate services and the service flows are then sent out of the VNF from the service VMs. FIG. 10 shows this type of composite VNF where there is a first load balancer virtual machine VM1 98 and a second load balancer virtual machine VM2 100 both providing load balancing functions and forwarding service flows to a first, second and third service virtual machine VM1 102, VM2 104 and VM3 106, which then continue the service flow to one or more other VNFs. An example of such a VNF might be a virtual Evolved Packet Core (vEPC) solution.

Figure 11:
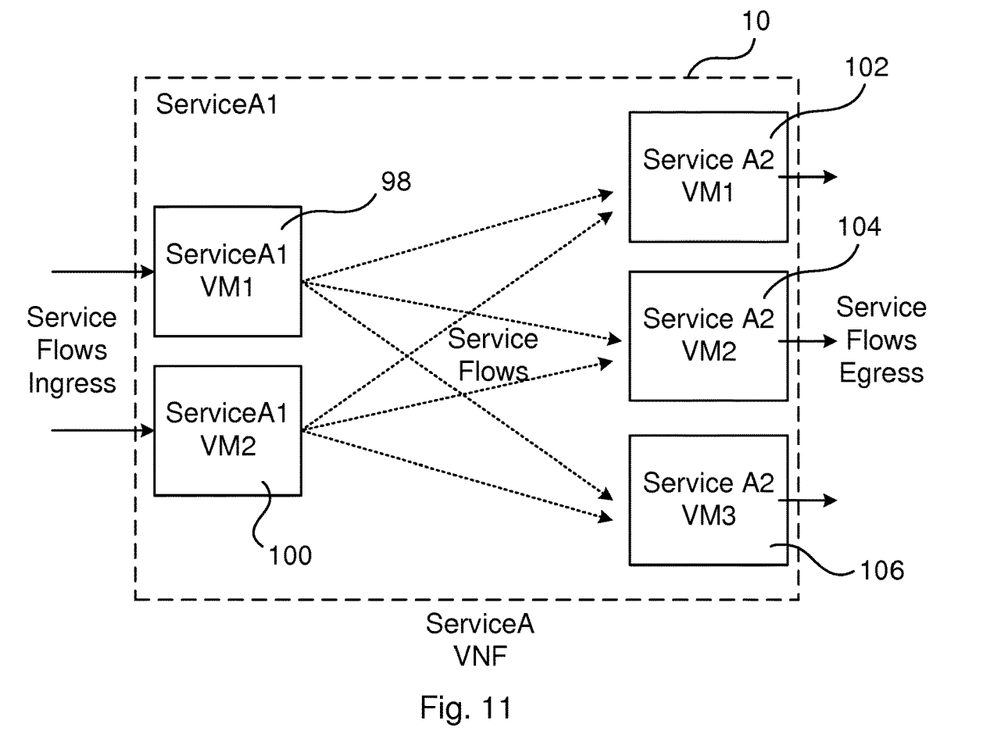

Another way of implementing a Composite VNF is through the composite VNF comprising one or more VMs processing service flows in a serial order. Moreover, this composite VNF may be a Composite VNF comprising multiple Service Touch Point VNFCs. An example is shown in FIG. 11 where some ServiceA VNF is internally decomposed into two sets of VMs—ServiceA1 and ServiceA2. An example of this model might be a co-located SGW and PGW in a vEPC VNF.

As can be seen in FIG. 11 there are two instances of a first set A1, being implemented in two separate virtual machines VM1 98 and VM2 100. There is also the instances of a second set A2, each instance being implemented in a separate virtual machine VM1 102, VM2 104 and VM3 106, where each virtual machine 98 and 100 implementing the first set A1 may direct service flows to each of the first, second and third virtual machines 102, 104 and 106 implementing the second set A2.

Figure 12:
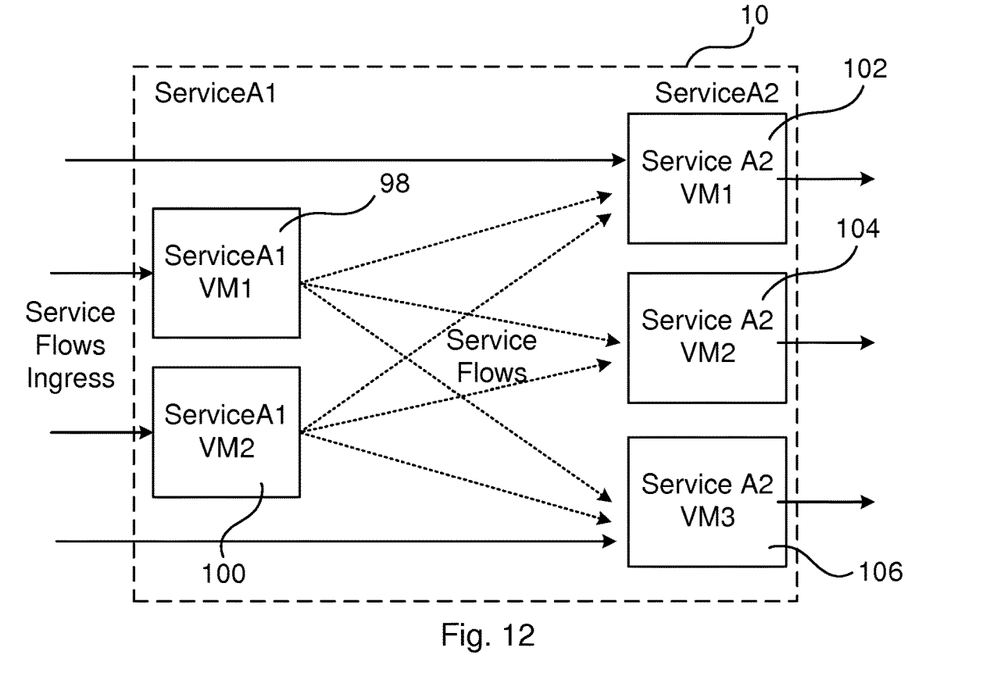

Yet another way of implementing a Composite VNF is shown in FIG. 12. As in FIG. 11 there are two instances of a first set A1 of service A, being implemented in two separate virtual machines VM1 98 and VM2 100 as well as three instances of a second set A2 of service A being implemented in separate virtual machines VM1 102, VM2 104 and VM3 106, where each of the first set of virtual machines 98 and 100 may direct service flows to each of the second set of virtual machines 102, 104 and 106. In this example, service flows may be addressed to any of the VNFCs in the given VNF. It can thereby be seen that service flows entering the VNF do not all go to the first set A1, but also to the second set A2.

In all the cases of composite VNFs mentioned above, the VNFCs may send and receive traffic from sibling VNFCs over a "virtual fabric" internal to the composite VNF, where a VNFC may implement one or more functions of a network node such as an SGW, PGW or a load balancer. This virtual fabric or vFabric, defines the connectivity between the VNFCs and may be using Virtual Local Area Networks (VLANs) or other overlay technologies and will run over the data centre (DC) underlay to provide inter connectivity to the VNFCs.

VNFCs sending traffic to other sibling VNFCs (in a composite VNF) over a vFabric, may be termed as Upstream vFabric Nexthop. The sibling VNFCs receiving traffic over the vFabric may be termed as Downstream vFabric Nexthop, where Nexthop indicates a preceding or succeeding network function in relation to a current network function, i.e. a network function a "hop" away in the traffic flow. A downstream vFabric Nexthop is thus a VNFC receiving traffic or packets from an upstream virtual network function via vFabric and an upstream vFabric nexthop is a virtual network function sending traffic or packets to a downstream VNFC via vFabric.

The NF Forwarding Graph of FIG. 3 provides and end-to-end Network service, via sequential processing across a series of VNFs. This scenario is to an extent analogous to the Composite VNF, in the sense that a set of VNFs interacting over a "network fabric" provide a Network Service.

Figure 13:
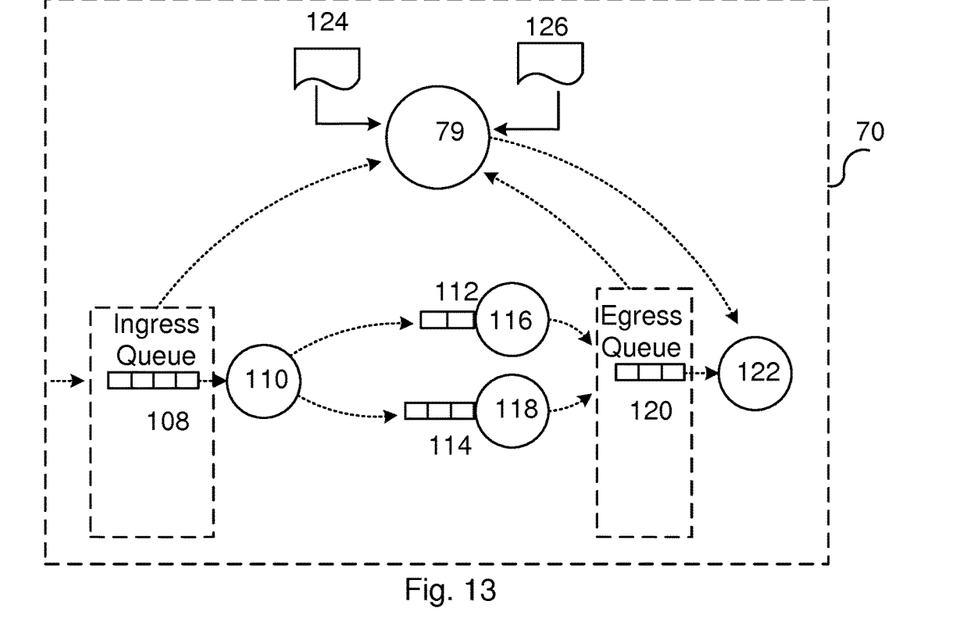

A logical diagram depicting VNFC packet processing is shown in FIG. 13.

FIG. 13 shows a Generic Forwarding Model in a Forwarding/Services VNFC that acts as a downstream VNFC receiving data packets from an upstream VNFC. This downstream VNFC may as an example be the VNFC 70 in FIG. 5 providing the functionality of the PGW 66 of FIG. 4 that receives data packets from one or more second upstream VNFC in the form of the VNFCs 71 and 72 implementing the functionalities of the load balancer 62 and/or the SGW 64.

A VNFC may then have a number of queues comprising at least one ingress or reception queue 108 and at least one egress or transmission queue 120, where data is received via the ingress queue 108 and transmitted via the egress queue 120. These queues are typically provided at the VNFC interfaces and the VNFC may be provided with ingress queue functionality such as a receiving or Rx thread 110 and egress queue functionality such as a transmitting or Tx thread 122. Moreover there may be a number of internal worker thread queues, where there may typically be one queue per type of processing. The data packets in such a thread queue are then handled by a worker thread 116 and 118. The processing may involve the worker threads 116 and 118 performing forwarding or service function pertaining to the nature of the network function on the packets in their associated queue 112 and 114.

In general, threads are realized as software blocks providing the thread functionality. The Rx and Tx threads are I/O threads responsible for handling the I/O of packets from logical or physical ports owned by the VNF/VNFC. The worker threads perform the business logic/service processing applicable to the specific VNF/VNFC instance, e.g. SGW/PGW processing, Deep Packet Inspection, Firewall rules, etc.

In the first VNFC 70 there is thus an ingress queue 108, an Rx thread 110 monitoring the ingress queue 108, a number of worker threads, here exemplified by two worker threads 116 and 118, each monitoring a corresponding worker thread queue 112 and 114, as well as an egress queue 120 monitored by a Tx thread 122.

The one of more ingress or reception queues 108 are thus being monitored by a receiving thread 110. The one (or more) Rx thread(s) 110 thus polls one or more network interfaces (virtualized network interface cards/virtual function/physical function VNICs/VF/PF) for one or more packets from an upstream VNFC. The Rx thread 110 may perform some basic initial processing of the packet, and eventually distribute it based upon some policy (hashing/spraying/etc.) to a worker thread Queue 112 or 114 associated with a worker thread 116 and 118. A first worker thread 116 may therefore be associated with a first worker thread queue 112 and a second worker thread 118 with a second worker thread queue 114.

As is stated above, the worker threads 116 and 118 are responsible for performing the forwarding or service function on the packets in their associated queue 112 and 114. Post the appropriate forwarding function, they transmit the packet to the egress queue 120. This queue 120 is serviced by one (or more) Tx threads 122, which may perform some post processing (e.g. Quality of Service QoS etc.) and then eventually send out the packets.

With a Scaled-out model of a component VNF, it is possible that one or more VNFCs (downstream vFabric nexthops) may get over-subscribed with regard to its packet processing ability while receiving and processing traffic received over vFabric (and possibly directly as well). The oversubscription leads to the data packet handling capacity of the node being strained. The oversubscription may be linked to the inability of the I/O threads to keep up with the arriving packet rate, leading to backlog in the Rx/Tx queues and eventual packet drops. It may also be linked to the inability of one or more worker threads to keep up with the packet rate while applying service processing to these packets or a subset of these packets.

Some of the cases in which the above may happen are:
a. A downstream VNFC receiving traffic over vFabric from multiple upstream VNFCs, leading to oversubscription of its forwarding/service capacity.
b. Relatively smaller burst of traffic sent from upstream vFabric nexthops to a specific downstream vfabric nexthop, but for "high touch traffic" which consumes higher CPU cycles in the Forwarding/Service Threads leading to building up of the Thread Queues, and thereby impacting other received traffic.

In this scenario of a downstream vFabric Nexthop or first VNFC getting oversubscribed, some or all of the traffic may get dropped. Also, this dropped traffic may be high priority traffic while low priority traffic gets forwarded.

This problem can potentially be seen by all types of Composite VNFs, including some of the cases listed earlier as well as in VNF Forwarding Graphs.

This situation is handled through the flow control functionality 73 implemented by the oversubscription determining device 74.

As can be seen in FIG. 13 there is also the first part 79 of the flow control functionality 73 in the downstream VNFC 70 and this first part 79 monitors the various queues and possibly also the threads. It also accesses an oversubscription monitoring policy 124 as well as an optional heatmap 126. Moreover, the first part 79 of the flow control functionality 78 also communicates with the Tx thread 122 in order to communicate with an upstream node or upstream VNFC needing to change its transmissions.

Figure 14:
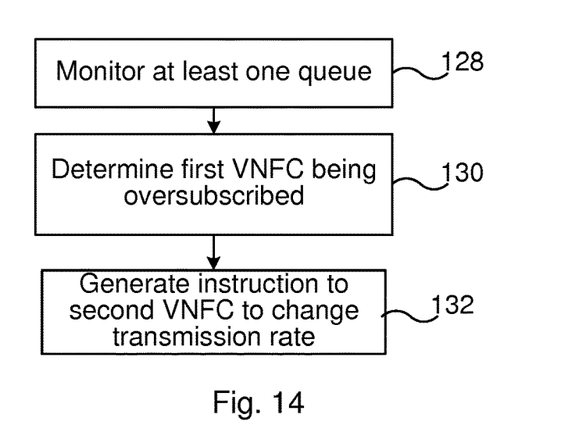
FIG. 14 shows a flow chart of method steps in a method of determining oversubscription in a first virtualized network function according to a first embodiment.

The operation of a first embodiment will now be described with reference being made to FIGS. 7 and 8 together with FIG. 14, which shows a flow chart of a number of method steps performed by the first part 79 of the flow control functionality 73 of the oversubscription determining device 74.

The queue monitoring unit QMU 80 monitors the at least one queue, step 128, and in the example of FIG. 13 monitors the ingress queue 108, the forwarding thread queues 112 and 114 as well as the egress queue 120. It is also possible that one or more of the threads 110, 116, 118 and 122 is being monitored. The oversubscription determining unit OSDU 82 then determines if the first VNFC, i.e. the downstream VNFC, is oversubscribed, step 130, which determination is based on the monitoring.

The determining of if the first VNFC is oversubscribed may comprise the oversubscription determining unit OSDU 82 tracking a queue occupancy measure of a queue, such as a forwarding service thread queue 112 or 114, the threshold comparing element TCS 88 of the oversubscription determining unit OSDU 82 comparing the queue occupancy measure with a threshold and the threshold crossing evaluating element TCEE 90 determining that the first VNFC 70 is oversubscribed in case the threshold is crossed. In this determining the queue occupancy measure may be the rate with which a queue is filled. Alternatively it may be the length of the queue. Here it is also possible that the occupancy is estimated using a moving average estimation of the length or rate.

If the first VNFC 70 is found to be oversubscribed, then it is optionally also possible for the upstream network function determining unit UNFDU 84 to determine an upstream VNFC at least partly responsible for the oversubscription. There are a number of ways in which an upstream VNFC may be determined. In the simplest case the monitored queue only receives data packets from one upstream VNFC, in which case the upstream VNFC is immediately determined as the oversubscription is determined. Another way may be through investigating all the packets in a queue for which an oversubscription was determined and determine the upstream VNFC as the VNFC that has the most significant data packet contribution to the queue, where the most significant contribution may be the VNFC contributing the highest number of packets or from which the influx rate is the highest.

The most significant contribution may be determined using a number of queue packet and queue attributes associated with the at least one queue and the queue occupancy measure, where an example of a queue packet attribute is a source media access control (MAC) address to identify an upstream source and another is a measure of the number of packets from the source in the queue and/or the rate with which packets from the source changes in the queue for instance in relation to the corresponding total queue occupancy measure or compared with corresponding queue attributes of other sources. Therefore, each upstream VNFC contributing packets to the queue may have its own set of queue attributes. In this case the queue attributes of the different upstream VNFCs may be investigated and an upstream VNFC determined to be instructed based on the attribute investigation.

If the first VNFC is found to be oversubscribed, then the upstream network function instruction generating unit UNFIGU 86 may generate an instruction for one or more of the upstream VNFCs to change transmission rate to the first VNFC in order to reduce the oversubscription, step 132. In case the first VNFC is the VNFC 70 implementing the functionality of the PGW 66, then the upstream VFNC may for instance be the VNFC 72 implementing the functionality of the load balancer 62 and/or the VNFC 71 implementing the functionality of the SGW 64. The instruction may merely be an instruction to reduce the packet transmission rate, which may correspond to a known amount of rate reduction. As an alternative the instruction may comprise a value that sets out the amount of rate reduction required corresponding to a degree of oversubscription or directly a desired transmission rate.

It can in this way be seen that it is possible to influence the rate with which an upstream VNFC transmits data packets to the first VNFC and thereby the oversubscription of the first VNFC can be reduced.

In this way there is provided an adaptive flow-control mechanism operating on the data flow between the virtualized network functions, such as inside a Composite VNF.

The overall mechanism is internal to the "Composite VNF" and has no dependency on the underlying cloud infrastructure.

1. The downstream VNFCs detect packet processing oversubscription scenarios. The "oversubscription" or packet handling capacity strain and its extent may be monitored via a set of tunable heuristic policies, taking into account the internal queues build-up for one or more worker threads, and a set of policy defined threshold values comprising at least one threshold value. This provides high granularity infrastructure to detect extent of oversubscription or strain at subset of flows level, and handle short to medium duration heavy bursts across the vFabric. The policy can be set for individual VNF/VNFC instances at the time of orchestration, taking into account the capabilities of the underlying cloud infrastructure like the CPU clock rating for the COTs servers on which the VNF/VNFCs may be getting orchestrated.

2. In case of detected oversubscription or change in the level of oversubscription, the applicable set of upstream VNFCs is identified. Send backpressure notification, i.e. a transmission change notification, to one or more upstream physical or virtual network functions which are actually contributing to the oversubscription, possibly with a computed oversubscription-weight or attribute denoting the degree of oversubscription.

3. The relevant upstream VNFCs, on receiving such a feedback, will update the outgoing traffic rate to the concerned downstream nexthop according to the rate reduction value.

Note that the mechanism also applies to VNF Forwarding Graph, when sibling VNFs shares the capability. In case of sibling VNFs not supporting the capability, there is no other performance impact.

Figure 15:
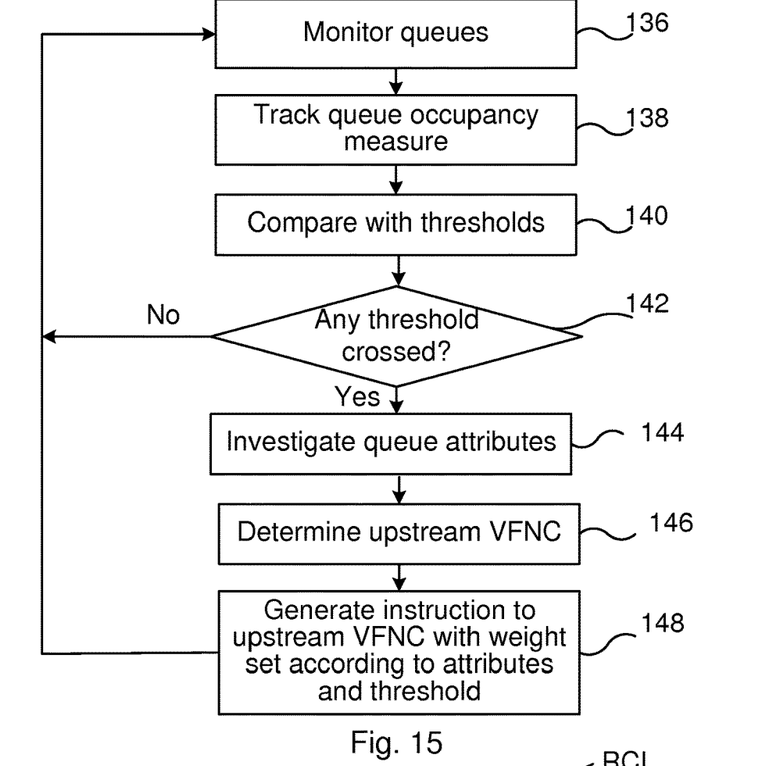
FIG. 15 shows a flow chart of method steps in a method of determining oversubscription in a first virtualized network function according to a second embodiment, FIG. 16 schematically shows the implementation of a second virtualized network function.

Now a second embodiment will be described with reference being made also to FIGS. 9 and 15, where FIG. 15 shows a flow chart of a number of method steps performed by the flow control handling functionality.

In this embodiment the queue monitoring unit 80 again monitors one or more of the different queues of the first node, step 136, i.e. the ingress or Rx queue, 108, the worker thread queues 112 and 114 as well as the egress or Tx queue 120. These queues may also be termed local queues.

The oversubscription determining unit 82 also tracks the queue occupancy measure of each monitored queue, step 138, where the queue occupancy measure in this embodiment is an average queue length.

For each of these queues, an average queue length, for instance in the form of an Exponential Weighted Moving Average (EWMA) value, is thus maintained. This value is used for comparison against threshold values to identify whether the respective queue is backlogged, and to what extent.

The queue occupancy measure is then compared with one or more of the thresholds, step 140, which is done by the threshold comparing element 88.

Each queue occupancy measure, for instance in the form of the previously mentioned EWMA value, is compared with corresponding thresholds of the oversubscription monitoring policy 124. This means that the oversubscription monitoring policy 124 comprises one set of thresholds for each packet handling resource being monitored, where there is one set of thresholds for each queue. If any threshold is crossed, step 142, signifying that there is oversubscription of the VNFC, then queue attributes of the queue are investigated, step 144. However if no such crossing is determined, step 142, then queue monitoring is continued, step 136.

One of the thresholds for a monitored queue may be a first threshold, the crossing of which involves the VNFC going from being normally subscribed to being oversubscribed. There may in this regard exist a number of further threshold values indicating different degrees of oversubscription. In operation, the threshold comparing element 88 may compare the queue occupancy measure with all the defined thresholds of a queue and the threshold crossing evaluating element 90 determines a degree of oversubscription based on which threshold is being crossed.

As an example, a policy may define three threshold values for the Rx and worker thread queues.

The three values may be:
T1: Low congestion watermark to indicate starting of congestion on a queue.
T2: Medium congestion watermark to indicate persistent congestion on a queue.
T3: High congestion watermark to indicate high level of congestion on a queue.
An example of a policy might be
Rx thread EWMA exceeds any of the values defined in a set of Threshold Values, from Low to High watermark
EWMA for more than ⅓rd of the worker thread queues with a set of Threshold Values (as defined in the previous example)

The OverSubscription Monitoring (OSM) Process, thus monitors the VNFC queues and for any given queue, any transition between threshold values (say from low to medium), will cause a new Backpressure event notification to be sent to the Upstream Nexthop, optionally with an own rate reduction value. The crossing of a threshold may thus trigger a corresponding instruction to be generated for an upstream VNFC to change its transmission rate to the first VNFC.

It can also be seen that the oversubscription determining unit 82 monitors the average length (EWMA) for the Local queues (Rx Queue, Worker Thread Queues, Tx Queue) for detecting a change in oversubscription as per the policy and Threshold values for these queues.

In order to identify the upstream VNFC that has the most significant data packet contribution to the queue and that therefore is to change its transmission rate, the queue attribute investigating element 92 of the upstream network function determining unit 84 of the flow control functionality 78 consults a per-upstream VNFC "Heatmap" 126. The heat map is a table which identifies the packets received in a given queue on a per upstream node basis. The table is maintained indexed by the upstream nodes. Through this heatmap 126, the queue attribute updating element 94 keeps, for every upstream network function, a number of related queue attributes associated with at least one queue and the corresponding queue occupancy measure, where queue packet attributes may again be source MAC address, measure of the number of packets per source and/or the rate with which packets from the source changes. The queue attribute updating element 94 may furthermore update the attributes as the content of the queues is changed. This may be done through maintaining, for each upstream source, an estimate for "recent" traffic seen from that upstream source. This "recent" mechanism is based on EWMA of packets received per upstream source.

In case of the oversubscription determining unit 82 detecting a transition in the oversubscription (e.g. exceeding low threshold), the queue attribute investigating element 92 investigates the queue attributes of queues on the downstream virtual network function corresponding to the different upstream VNFCs, step 144, and determines an upstream VNFC to be instructed based on the attribute investigation, step 146. It thus determines a second upstream network function at least partly responsible for the oversubscription It may do this through querying the Heat-Map 126 and identifying the responsible upstream nexthop(s), for instance those with their AvgQueueLength higher than the current Threshold. In this way it determines at least the upstream VNFC having the main responsibility for the oversubscription or oversubscription change.

As is mentioned earlier, the upstream network function determining element 96 may also compute an Oversubscription Weight attributable to the respective upstream nexthop(s). This weight may be defined as: Oversubscription-weight=Current AvgQueueLength/Highest Defined Threshold. The oversubscription weight may correspond to an estimated transmission rate of the upstream network function. Therefore the upstream network function determining element 96 may determine the transmission rate of the second upstream network function The upstream network function determining element 96 may more particularly use the "oversubscription-weight" to derive a transmission rate reduction Feedback (Fb) value to the corresponding upstream nexthop. When generating an instruction for the upstream network function to change its transmission rate to the first virtualized network function it thus generates an instruction for the determined upstream network function to reduce its transmission rate.

Thereafter the upstream network function informing unit 86 sends the instruction to change transmissions to the concerned upstream nexthops and updates the local state to capture the event details. It thus generates an instruction to the upstream VNFC, which instruction comprises a the feedback or rate reduction value related to the oversubscription weight determined based on the attributes of the VNFC as well as the threshold crossed, step 148. Thereby an instruction to reduce transmission rate comprises a value identifying an amount of transmission rate change based on at least one attribute.

Thereafter queue monitoring is again resumed, step 136.

In the determining of upstream VNFC of both the first and second embodiments, it is possible to also consider quality of service (QoS). It is thereby possible that the instruction to change transmission rate may be the instruction to change the transmission rate with regard to a certain QoS, such as a low priority QoS. This may be implemented through the instruction comprising an indication of the QoS for which the rate of change is applicable.

For supporting QoS, the Local queues and the corresponding Heat-Map Logical Queues can be made QoS aware, which implies there may be say 4 or 8 QoS attributes (depending on number of QoS classes) per upstream vFabric Nexthop.

When QoS support is enabled, the backpressure or indication may be sent with regard to specific QoS attributes to this upstream vFabric Netxhop, and the relevant state will be maintained with regard to the specific attributes. Thereby rate reduction may be performed with regard to different QoSs.

The following example shows the interworking of the Oversubscription Monitoring using threshold values and the Heat-Map.

TABLE 1

Queue and Threshold Definition

| Max Queue Length | Threshold Counts | Thresholds |
|---|---|---|
| 24 | 3 | (T1 = 12, T2 = 16, T3 = 20) |

TABLE 2

Forwarding Thread Queue Backlog Runtime State Snapshot

| Queue | Current Queue Length | Average Queue Length | Previous Threshold Hit |
|---|---|---|---|
| Worker Thread 1 | 18 | 14 | T1 |
| Worker Thread 2 | 8 | 5 | None |
| Worker Thread 3 | 10 | 12 | T2 |
| Worker Thread 4 | 20 | 20 | T2 |

It can be seen that table I shows Queue and Threshold definition: The worker thread queue length is defined as 24 packets. Three distinct threshold values are defined in terms of Avg Queue Occupancy, and these are 12, 16 and 20 respectively.

Table 2 in turn shows a Worker Thread Queue Backlog Runtime State Snapshot with the queue states in a running system at some time T. As per the table, the Worker-Thread1 AvgQueueLength is beyond the first threshold. The Prev-Threshold is set to T1, which means that an instruction or a BackPressure event was generated when the AvgQueueLength hit T1. In the case of WorkerThread3, the current value of AvgQueueLength is 12, but the PrevThresholdHit value shows T2. This implies that the AvgQueueLength had hit T2 (or higher) in the recent past, leading to a corresponding BackPressure event being generated. Post that the AvgQueueLength has come down to 12.

Figure 16:
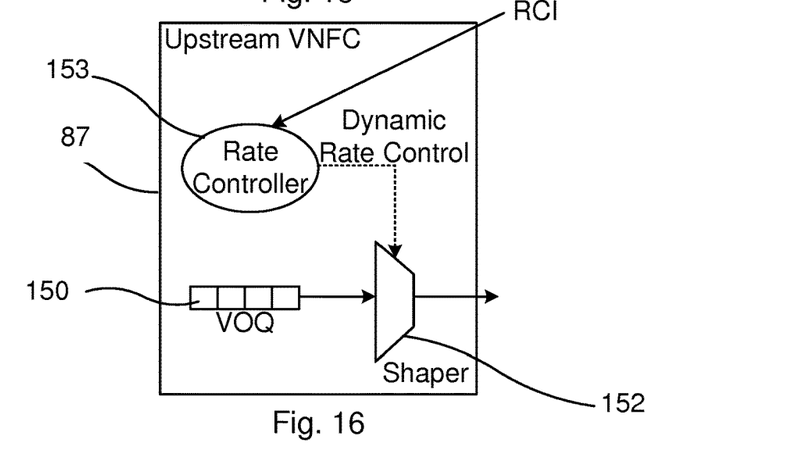

FIG. 16 schematically shows an example of the second part 87 of the flow control functionality 73 provided in a second upstream virtual network function, here the VNFC 71, that receives an instruction RCI to reduce transmission rate from the first downstream virtual network function. VNFC 71 comprises a Virtual Output Queue (VOQ) 150, a shaper 152 set to shape the transmission rate with which packets are transmitted and a transmission rate control unit 153 that receives the rate change instruction RCI and controls the shaper 152 based on it. The upstream VNFC here keeps one such queue 150, shaper 152 and transmission control unit 153 per downstream VNFC to which it transmits data packets. It can thereby be seen that it is possible for the second virtualized network function to comprise a virtual output queue dedicated to another downstream function than the previously described first virtualized network function.

The upstream VNFC may have a similar type of realization as the first or downstream VNFC with an egress queue and a Tx thread operating on this queue. It thereby maintains Virtual Output Queues (VOQs) corresponding to each downstream destination service/forwarding VNFC nexthop to which it sends packets. Packets destined to these vFabric nexthops are buffered in the destination specific VOQs.

The rate control unit 157 for a VOQ (corresponding to a given destination) may be realized as a so-called Ethernet Congestion Control and Prevention (CCP) Controller mechanism as disclosed in WO2016/128931 or a Quantized Congestion Notification (QCN) Reaction Point mechanism as disclosed in "Proactive Ethernet Congestion Control Based on Link utilization Estimation", ICNC 2016.

Figure 17:
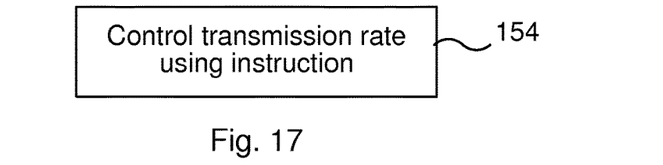
FIG. 17 shows a method step for controlling the transmission rate in the second virtualized network function.

FIG. 17 shows a method step for controlling the transmission rate of the upstream VNFC 71.

When the rate control unit 87 in the upstream VFNC 71 receives the instruction RCI for the VNFC 71 to change its transmission rate, perhaps together with a rate change value, it then controls the transmission rate with which data packets are transmitted for the VOQ 150 based on the instruction, step 154.

The objective of the transmission rate control unit 153 is to manage the outgoing traffic rate from a given VOQ 150 to the corresponding destination, so as not to cause oversubscription at the destination.

The servicing of the VOQs is controlled via the shaper 152 and the transmission rate control unit 153. The transmission rate control unit 153 determines a transmit rate dynamically, with Rate Decrease based on the feedback value received from any downstream VNFC and Rate Increase driven via clocking derived from Timer and Byte Counter of the VNFC (amount of traffic sent to the downstream source).

Rate Decrease: The feedback value received from the downstream source is used as the input to bring down the transmit rate. Feedback value can be a value as defined for ECCP or for QCN mentioned above.

Rate Increase: Once the rate is decreased, the algorithm strives to find the optimal higher rate at which the downstream VNFC nexthop deals with the traffic load from this source. This rate increase mechanism may be split into two (or optionally three) phases.

The first phase may be termed as Fast Recovery and may use Averaging Principle to perform a binary search for a next higher rate. After 5 cycles of FR are over, the algorithm moves to the next phase—Active Increase. In this phase, the algorithm probes for extra bandwidth to the destination.

As it is possible to keep one VOQ, transmission rate control unit and shaper for every downstream function in the upstream VNFC, the transmission rate of each output queue may be independently controlled based on different indications of transmission rate reductions from different downstream functions.

It can be seen that aspects of the invention provides an Adaptive rate-control VOQ based mechanism over the vFabric, working across upstream and downstream virtual fabric endpoints (VNFCs). The mechanism is internal to the composite VNF with no dependency on the cloud infrastructure (VNFI layer).

The mechanism allows adaptive control of service flows in a Composite VNF, allowing the VNF to correctly handle bursts on service flows, and avoid undesirable head-of line (HOL) blocking scenarios. The mechanism also applies to VNF Forwarding Graphs.

Figure 18:
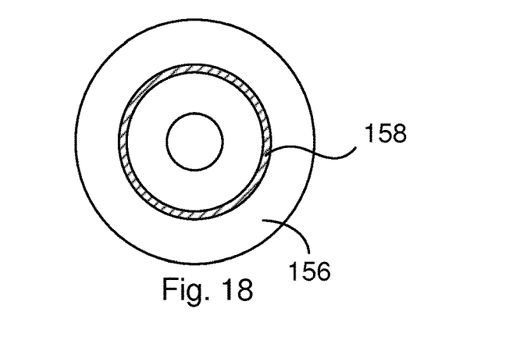
FIG. 18 shows a computer program product comprising a data carrier with computer program code for implementing the flow control functionality of the device for determining oversubscription.

The computer program code of a device for determining oversubscription may be in the form of computer program product for instance in the form of a data carrier, such as a CD ROM disc or a memory stick. In this case the data carrier carries a computer program with the computer program code, which will implement the flow control functionality. One such data carrier 156 with computer program code 158 is schematically shown in FIG. 18.

The flow control functionality of the device may be considered to form means for determining oversubscription may be realized as means for monitoring at least one queue, means for determining if the first virtualized network function is oversubscribed based on the monitoring, and means for generating, in case the first virtualized network function is determined to be oversubscribed, an instruction for at least one upstream network function to change its transmission rate to the first virtualized network function in order to reduce the oversubscription.

The flow control functionality may also be considered to comprise means for tracking a queue occupancy measure of the queue and means for comparing the queue occupancy measure with a first threshold. The means for determining that the first virtualized network function is oversubscribed may in this case be in case be means for determining that the first virtualized network function is oversubscribed if the first threshold is crossed The means for determining if the first virtualized network function is oversubscribed may comprise means for comparing the queue occupancy measure with a further threshold and means for determining a degree of oversubscription based on which threshold is being crossed. In this case the means for generating an instruction may comprise means for generating an instruction to the at least one upstream network function to change its transmission rate to the first virtualized network function triggered by the crossing of a corresponding threshold.

The flow control functionality may further comprise means for determining a second upstream network function at least partly responsible for the oversubscription and means for determining the transmission rate of the second upstream network function. In this case the means for generating an instruction for at least one upstream network function to change its transmission rate to the first virtualized network function may comprise means for generating an instruction for the determined upstream network function to reduce its transmission rate.

The flow control functionality may further comprise means for keeping, for every upstream network function, a number of related queue attributes associated with the at least one queue and the queue occupancy measure, means for investigating the queue attributes of the different upstream network functions and means for determining an upstream network function to be instructed based on the attribute investigation.

The flow control functionality may furthermore comprise means for updating the attributes as content of the queues is changed.

The flow control functionality may additionally comprise means for controlling the transmission rate of the transmissions from an output queue of the second network function dedicated to the first network function according to the instruction.

Moreover, the flow control functionality may comprise means for independently controlling the transmission rate of each output queue of the second virtualized network function based on different indications of transmission rate reductions from different downstream functions.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A device for determining oversubscription of a first virtualized network function in order to enable flow control in the virtualization of at least one node in a communication network, the device comprising a first virtualized network function having packet handling resources comprising at least one queue and being a downstream network function located downstream from at least one second upstream network function in a packet flow between the network functions, the device comprising a processor acting on computer instructions whereby the device is operative to implement flow control functionality by:

monitoring said at least one queue;

determining if the first virtualized network function is oversubscribed based on said monitoring; and generating, in case the first virtualized network function is determined to be oversubscribed, an instruction (RCI) for at least one upstream network function to change its transmission rate to the first virtualized network function in order to reduce the oversubscription, wherein the second network function is a virtualized network function having an output queue dedicated to the first network function, and wherein the device is further operative to implement flow control functionality by controlling the transmission rate of the transmissions from the output queue according to the instruction (RCI).

2. The device according to claim 1, wherein the device is further operative to implement flow control functionality by tracking a queue occupancy measure of the queue and when, being set to determine if the first virtualized network function is oversubscribed, comparing the queue occupancy measure with a first threshold and determining that the first virtualized network function is oversubscribed in case the first threshold is crossed.

3. The device according to claim 2, wherein there is a set of further thresholds and the flow control functionality, when determining if the first virtualized network function is oversubscribed, compares the queue occupancy measure with a further threshold and determines a degree of oversubscription based on which threshold is being crossed, wherein the crossing of a threshold also triggers the generation of a corresponding instruction to the at least one upstream network function to change its transmission rate to the first virtualized network function.

4. The device according to claim 2, wherein at least one threshold is tuneable.

5. The device according to claim 1, wherein the device is further operative to implement flow control functionality by determining a second upstream network function at least partly responsible for the oversubscription, determining the transmission rate of the second upstream network function and, when generating an instruction for at least one upstream network function, changing its transmission rate to the first virtualized network function to generate an instruction (RCI) for the determined upstream network function to reduce its transmission rate.

6. The device according to claim 5, wherein the device is further operative to implement flow control functionality by keeping, for every upstream network function, a number of related queue attributes associated with said at least one queue and the queue occupancy measure, investigating the queue attributes of the queues on the downstream virtual network function corresponding to the different upstream network functions and determining an upstream network function to be instructed based on the attribute investigation.

7. The device according to claim 6, wherein an instruction comprises a value identifying an amount of transmission rate change based on at least one attribute.

8. The device according to claim 5, wherein the instruction for the determined upstream network function comprises an indication of a quality of service for which the rate of change is applicable.

9. The device according to claim 1, wherein the second virtualized network function also comprises an output queue dedicated to another downstream function, where the transmission rate of each output queue is independently controlled based on different indications of transmission rate reductions from different downstream functions.

10. A method of determining oversubscription of a first virtualized network function for enabling flow control in the virtualization of at least one node in a communication network, where the first virtualized network function has packet handling resources comprising at least one queue and being a downstream network function located downstream from at least one second upstream network function in a packet flow between the network functions, the method being performed by flow control functionality in a device for determining oversubscription and comprising:
monitoring said at least one queue;
determining if the first virtualized network function is oversubscribed based on said monitoring;
generating, in case the first virtualized network function is determined to be oversubscribed, an instruction (RCI) for at least one upstream network function to change its transmission rate to the first virtualized network function in order to reduce the oversubscription; and
determining a second upstream network function at least partly responsible for the oversubscription and the transmission rate of this function, where the generating of an instruction for at least one upstream network function to change its transmission rate to the first virtualize network function comprises generating an instruction (RCI) for the determined upstream network function to reduce its transmission rate.

11. The method according to claim 10, further comprising tracking a queue occupancy measure of the queue and the determining if the first virtualized network function is oversubscribed comprises comparing the queue occupancy measure with a first threshold and determining that the first virtualized network function is oversubscribed in case the first threshold is crossed.

12. The method according to claim 11, wherein there is a set of further thresholds and the determining if the first virtualized network function is oversubscribed comprises comparing the queue occupancy measure with a further threshold and determining a degree of oversubscription based on which threshold is being crossed, wherein the crossing of a threshold also triggers the generation of a corresponding instruction to the at least one virtualized upstream network function to change its transmission rate to the first virtualized network function.

13. The method according to claim 10, further comprising keeping, for every upstream network function, a number of related queue attributes associated with said at least one queue and the queue occupancy measure, and investigating the queue attributes of queues on the downstream virtual network function corresponding to the different upstream network functions, where the determining of an upstream network function to be instructed is based on the attribute investigation.

14. The method according to claim 13, wherein an instruction comprises a value identifying an amount of transmission rate change based on at least one attribute.

15. The method according to claim 10, wherein the instruction for the determined upstream network function comprises an indication of a quality of service for which the rate of change is applicable.

16. The method according to claim 10, wherein the second network function is a virtualized network function having an output queue dedicated to the first network function, the method further comprising controlling the transmission rate of the transmissions from the output queue according to the instruction (RCI).

17. A computer program product for determining oversubscription of a first virtualized network function in order to enable flow control in the virtualizing of at least one node in a communication network, where the first virtualized network function has packet handling resources comprising at least one queue and is a downstream network function located downstream from at least one second upstream network function in a packet flow between the network functions, the computer program product comprising a non-transitory computer readable medium storing a computer program comprising code which, when executed on at least one processor, cause the at least one processor to:
monitor said at least one queue;
determine if the first virtualized network function is oversubscribed based on said monitoring; and
instruct, in case oversubscription is being determined, at least one virtualized upstream network function to change its transmission rate to the first virtualized network function in order to reduce the oversubscription,
wherein the second network function is a virtualized network function having an output queue dedicated to the first network function, and wherein the device is further operative to implement flow control functionality by controlling the transmission rate of the transmissions from the output queue according to the instruction (RCI).

* * * * *